United States Patent
Won et al.

(10) Patent No.: US 10,860,288 B2
(45) Date of Patent: Dec. 8, 2020

(54) DISPLAY DEVICE AND CONTROL METHOD THEREOF

(71) Applicant: LG ELECTRONICS INC., Seoul (KR)

(72) Inventors: Jongpil Won, Seoul (KR); Soungsoo Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 30 days.

(21) Appl. No.: 15/540,531

(22) PCT Filed: Mar. 2, 2015

(86) PCT No.: PCT/KR2015/001978
§ 371 (c)(1),
(2) Date: Jun. 28, 2017

(87) PCT Pub. No.: WO2016/117754
PCT Pub. Date: Jul. 28, 2016

(65) Prior Publication Data
US 2017/0351486 A1      Dec. 7, 2017

(30) Foreign Application Priority Data
Jan. 22, 2015   (KR) .................... 10-2015-0010555

(51) Int. Cl.
*G06F 3/048*   (2013.01)
*G06F 3/16*    (2006.01)
(Continued)

(52) U.S. Cl.
CPC ............ *G06F 3/167* (2013.01); *G06F 3/013* (2013.01); *G06F 3/04817* (2013.01); *G06F 9/451* (2018.02); *G06F 9/453* (2018.02)

(58) Field of Classification Search
CPC .......... G06F 3/167; G06F 3/0482; G06F 3/01; G06F 3/012; G06F 3/013
See application file for complete search history.

(56) References Cited

U.S. PATENT DOCUMENTS

2009/0253463 A1* 10/2009 Shin .................. H04M 1/72583
                                                                455/563
2012/0293406 A1* 11/2012 Park ...................... G06F 1/1626
                                                                345/156
(Continued)

FOREIGN PATENT DOCUMENTS

JP        2004286396 A    * 10/2004
KR     1020090115599        11/2009
(Continued)

OTHER PUBLICATIONS

KR-10-2013-0065437; Yeong-Min Jeong; published on Jul. 17, 2020; 20 pages.*

(Continued)

*Primary Examiner* — Linh K Pham
(74) *Attorney, Agent, or Firm* — Lee, Hong, Degerman, Kang & Waimey PC

(57) ABSTRACT

Disclosed are a display device capable of voice recognition and a control method thereof. A display device, according to one embodiment of the present invention, comprises a display module which displays, on a first region, at least one icon arranged in a preset order; a sensing module which senses an action for entering a voice command mode; a memory for storing at least one item of data; and a controller which refers to the memory, and extracts text corresponding to the icon that is displayed on the first region, wherein the controller controls such as that the extracted text is displayed on a second region, and, if a voice command corresponding (Continued)

to the text displayed on the second region is recognized, the icon displayed on the first region is activated.

8 Claims, 21 Drawing Sheets

(51) Int. Cl.
  *G06F 9/451* (2018.01)
  *G06F 3/01* (2006.01)
  *G06F 3/0481* (2013.01)

(56) References Cited

U.S. PATENT DOCUMENTS

| | | | | |
|---|---|---|---|---|
| 2013/0218572 | A1* | 8/2013 | Cho | G06F 3/167 704/275 |
| 2014/0142953 | A1* | 5/2014 | Kim | G10L 15/22 704/275 |
| 2014/0165006 | A1* | 6/2014 | Chaudhri | G06F 3/04817 715/835 |
| 2014/0325360 | A1* | 10/2014 | Jung | G06F 3/04883 715/728 |
| 2015/0194167 | A1* | 7/2015 | Jeong | G06F 3/167 704/275 |
| 2015/0195356 | A1* | 7/2015 | Kim | H04W 4/18 709/217 |
| 2016/0132292 | A1* | 5/2016 | Jeoung | H04M 1/7255 715/727 |
| 2016/0202948 | A1* | 7/2016 | Chen | G06F 3/1454 715/746 |
| 2016/0210966 | A1* | 7/2016 | Koganei | G10L 15/083 |
| 2016/0299570 | A1* | 10/2016 | Davydov | G06F 1/163 |

FOREIGN PATENT DOCUMENTS

| | | | |
|---|---|---|---|
| KR | 1020110038424 | 4/2011 | |
| KR | 1020120080069 | 7/2012 | |
| KR | 1020130018464 | 2/2013 | |
| KR | 101419764 B1 * | 7/2014 | ........... G06F 3/0482 |
| KR | 1020140132246 | 11/2014 | |

OTHER PUBLICATIONS

Piekarski et al.; An Architecture for Outdoor Wearable Computers to Support Augmented Reality and Multimedia Applications; IEEE; 1999; 4 pages.*

Yamamoto et al.; Remote controller with television function; JP-2004286396; Oct. 14, 2004; 14 pages.*

PCT International Application No. PCT/KR2015/001978, Written Opinion of the International Searching Authority dated Oct. 5, 2015, 18 pages.

* cited by examiner

FIG. 13

| icon | text | frequency |
|---|---|---|
| | recording box | 10 |
| | hard drive | 1 |
| | LG Cloud | 5 |

FIG. 15
| icon | text | frequency |
|---|---|---|
|  | hard drive | 8 |
|  | LG Cloud | 2 |
| ... | ... | ... |

FIG. 17
| icon | text | frequency |
|---|---|---|
|  | search window | 12 |
|  | close | 25 |
|  | photo box | 8 |
|  | connection help | 22 |

DISPLAY DEVICE AND CONTROL METHOD THEREOF

CROSS-REFERENCE TO RELATED APPLICATIONS

This application is the National Stage filing under 35 U.S.C. 371 of International Application No. PCT/KR2015/001978, filed on Mar. 2, 2015, which claims the benefit of earlier filing date and right of priority to Korean Application No. 10-2015-0010555, filed on Jan. 22, 2015, the contents of which are all hereby incorporated by reference herein in their entirety.

TECHNICAL FIELD

The present invention relates to a display device and a control method thereof, and for example, a display device capable of voice recognition, more specifically, which is applicable to all of a cellular phone, a TV, a Tablet PC, etc.

BACKGROUND ART

Voice recognition (or speech recognition) technology means that language meaning is identified from voice by an automatic means. Specifically, voice recognition is a process for identifying words or word streams by inputting voice waveforms and extracting meaning of the words or word streams, and is categorized into five types such as voice analysis, phonemic recognition, word recognition, sentence interpretation, and meaning extraction. In a narrow sense, voice recognition may mean voice analysis and word recognition. As one of human-machine interface improvement, the technology of voice recognition for inputting information as voice and voice synthesis for outputting information as voice has been studied and developed for a long time.

Particularly, performance of voice recognition has been recently improved in accordance with the development of a voice recognition engine, and a cellular phone, TV, etc., each of which is provided with a voice recognition engine, has been introduced. However, the current technology has a problem in that a user should previously memorize a corresponding voice to execute a specific command.

Therefore, even in case of a device having good voice recognition performance, if a user does not know a reserved word for a specific command in advance, it is impossible to execute a corresponding command through a voice.

DISCLOSURE

Technical Problem

An object of the present invention is to solve the aforementioned problem and other problems.

Another object of the present invention is to provide a solution for extracting a text corresponding to a random icon if the text corresponding to the icon is not displayed.

Still another object of the present invention is to solve a problem when a text corresponding to a random icon cannot be extracted.

Further still another object of the present invention is to suggest a technology of tracking a user's eyes to reduce load of an extraction process of a text corresponding to a random icon.

It will be appreciated by persons skilled in the art that the objects that could be achieved with the present invention are not limited to what has been particularly described herein above and the above and other objects that the present invention could achieve will be more clearly understood from the following detailed description.

Technical Solution

To achieve the above or other objects, according to one embodiment of the present invention, a control method of a display device capable of voice recognition comprises the steps of displaying at least one or more icons arranged in accordance with a predetermined order on a first area; sensing an action for entrance of a voice command mode; extracting a text corresponding to the icon displayed on the first area with reference to a memory; and executing the icon displayed on the first area if a voice command corresponding to the text displayed on the second area is recognized.

A display device capable of voice recognition according to one embodiment of the present invention comprises a display module for displaying at least one or more icon arranged in a predetermined order, on a first area; a sensing module for sensing an action for entrance of a voice command mode; a memory for storing at least one of data; and a controller for extracting a text corresponding to the icon displayed on the first area, with reference to the memory, wherein the controller displays the extracted text on a second area, and, if a voice command corresponding to the text displayed on the second area is recognized, executes the icon displayed on the first area.

Advantageous Effects

Advantageous effects of a display device capable of voice recognition and a control method thereof according to the present invention are as follows.

According to at least one of the embodiments of the present invention, there is provided a solution for extracting a text corresponding to a random icon if the text corresponding to the icon is not displayed.

According to at least one of the embodiments of the present invention, it is possible to solve a problem when a text corresponding to a random icon cannot be extracted.

According to at least one of the embodiments of the present invention, it is advantageous that a technology of tracking a user's eyes is suggested to reduce load of an extraction process of a text corresponding to a random icon.

Additional scope of applicability of the present invention will be apparent from the following detailed description. However, since various modifications and corrections may explicitly be understood by persons skilled in the art within spirits and scope of the present invention, the detailed description and a specific embodiment such as the preferred embodiment of the present invention should be understood to be only given as an example.

BRIEF DESCRIPTION OF THE DRAWINGS

FIGS. 12 and 13 are diagrams illustrating a process of generating icon and text mapping data in accordance with one embodiment of the present invention.

FIGS. 14 and 15 are diagrams illustrating a process of generating icon and text mapping data in accordance with another embodiment of the present invention.

FIGS. 16 and 17 are diagrams illustrating a process of generating icon and text mapping data in accordance with other embodiment of the present invention.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
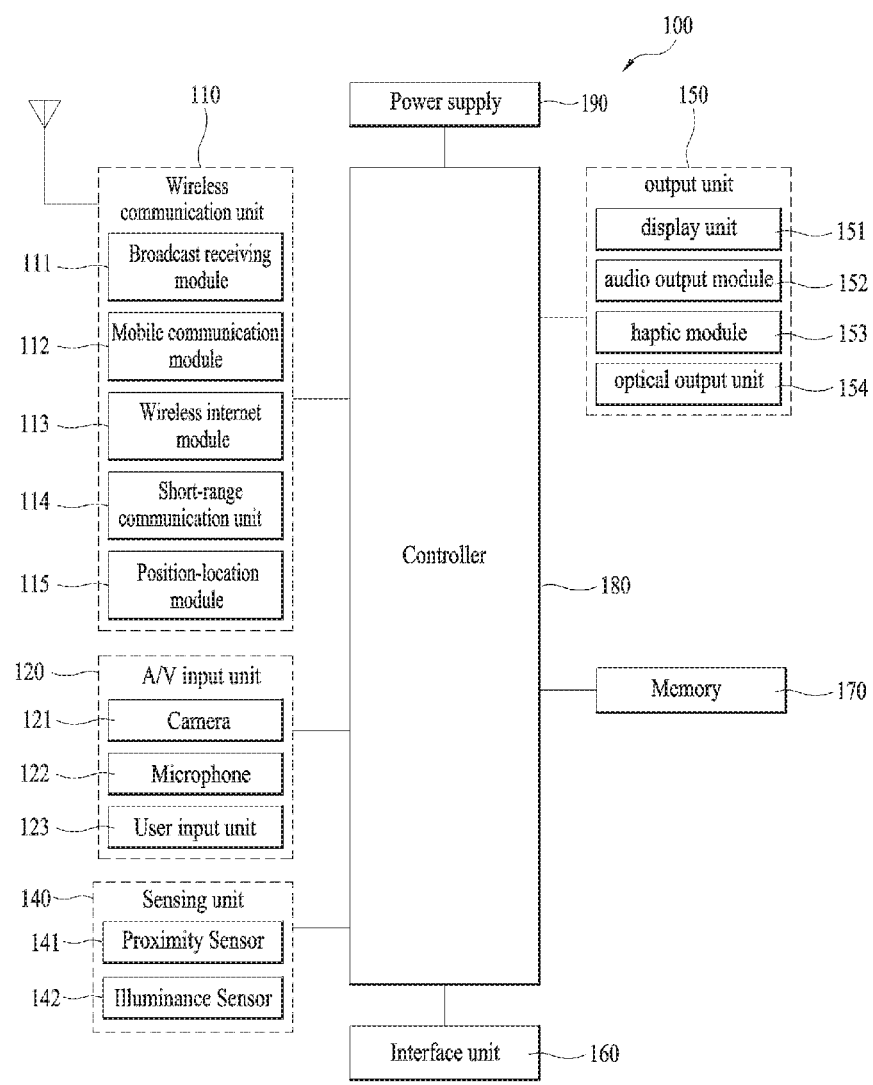
FIG. 1A is a block diagram of a mobile terminal in accordance with the present disclosure.
Figure 1B:
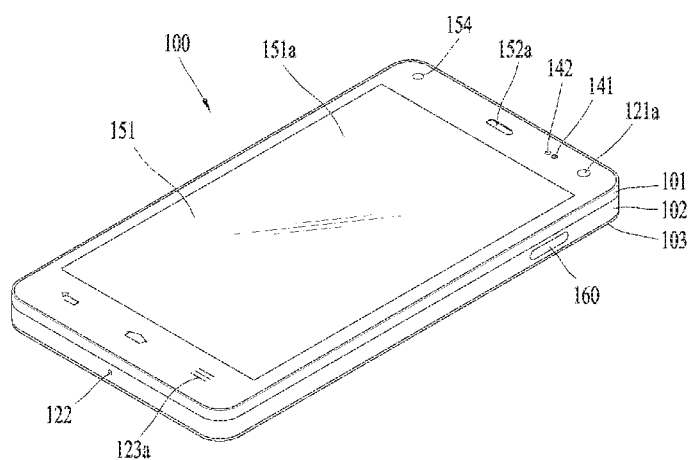
FIGS. 1B and 1C are conceptual views of one example of the mobile terminal, viewed from different directions.
Figure 1C:
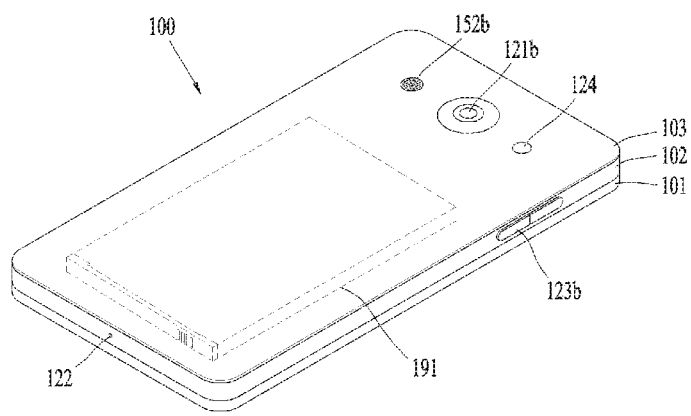

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
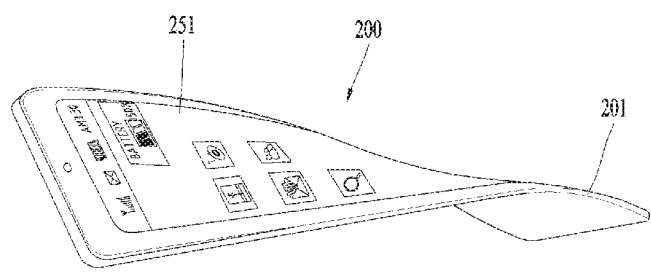
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state(or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
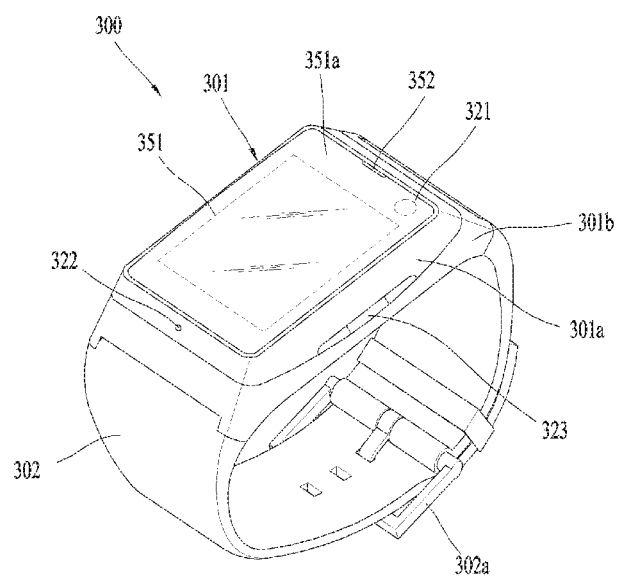
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
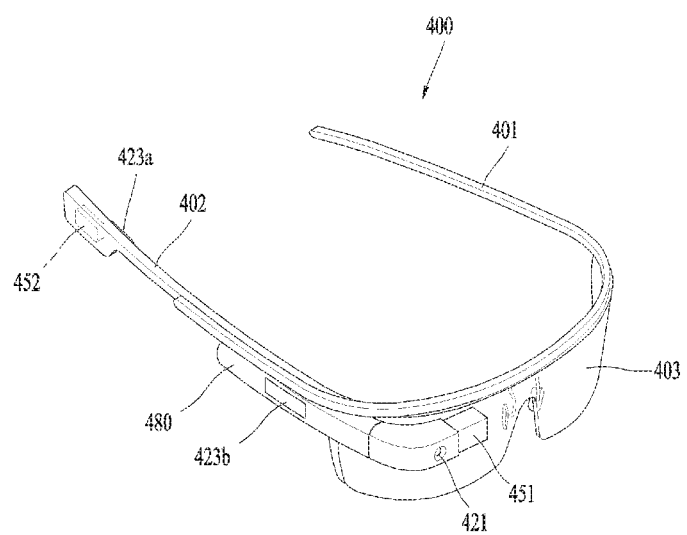
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A(Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB(Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Hereinafter, embodiments related to a control method that may be implemented in the mobile terminal configured as above will be described with reference to the accompanying drawings. It will be apparent to those skilled in the art that the present invention may be embodied in other specific form within the range that does not depart from spirits and essential features of the present invention.

Therefore, the display device according to one embodiment of the present invention is applicable to the aforementioned mobile terminal, glasses, watch, etc., and is also applicable to a TV or a smart TV. Moreover, it is assumed that the display device according to one embodiment of the present invention is a device capable of voice recognition. All voice recognition technologies known in the art may be introduced.

For example, the voice recognition technology analyzes an input voice through a computer, extracts features of the voice, measures similarity with a voice model database, which is previously collected, and then converts the voice most similar to the voice model database to a text or command language.

The voice recognition technology is a kind of pattern recognition process, and collects voice data from many people if possible due to voice tone, pronunciation, intonation, etc., which are different per people, and extracts common features from the collected voice data to generate a reference pattern.

Moreover, the voice recognition process is categorized into a pre-process portion and a recognition portion, wherein the pre-process portion removes a noise component by discovering a section for a recognition object from a voice uttered by a user and extracts features for the recognition process. Meanwhile, the recognition portion outputs the most possible word as a recognition result by comparing the input voice with a voice database, and restricts comparison words by using a language model when recognizing a sentence not a simple command language, thereby enhancing recognition performance.

The voice recognition technology is categorized in accordance with a speech form, recognition object speaker and word. The voice recognition technology is categorized into isolated word recognition, which is the most elementary stage, connected word recognition, continuous speech recognition and keyword recognition in accordance with the speech form.

The voice recognition technology is categorized into speaker dependent recognition in which a specific speaker or user previously trains a recognition engine through his/her voice, speaker independent recognition in which random speaker phonation can be recognized, and speaker adoption recognition in which a user allows a speaker independent recognition engine to adapt to his/her voice to enhance a recognition rate of his/her voice, in accordance with the recognition object speaker.

The voice recognition technology is categorized into fixed vocabulary recognition in which a recognition object word is fixed and flexible vocabulary recognition in which a recognition object unit may be updated frequently, in accordance with the recognition word.

Hereinafter, the technology of extracting a text suitable for an icon output to a screen and automatically suggesting the extracted text to a user will be described in more detail with reference to FIGS. 5 to 19.

Figure 5:
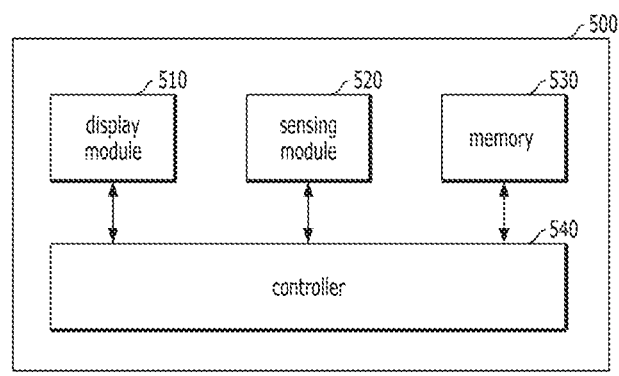
FIG. 5 is a diagram briefly illustrating internal components of a display device according to one embodiment of the present invention.

FIG. 5 is a diagram briefly illustrating internal components of a display device according to one embodiment of the present invention. The display device 500 shown in FIG. 5 corresponds to a TV, a cellular phone, etc., for example. Although not shown in FIG. 5, the display device 500 is provided with an engine or module capable of the aforementioned voice recognition.

As shown in FIG. 5, the display device 500 capable of voice recognition includes a display module 510, a sensing module 520, a memory 530, and a controller 540.

The display module 510 displays at least one or more icons arranged in accordance with a predetermined order on a first area, and the sensing module 520 senses an action for entrance of a voice command mode.

The memory 530 stores at least one data, and the controller 540 extracts a text corresponding to the icon displayed on the first area with reference to the memory 530.

Moreover, the controller 540 displays the extracted text on a second area, and controls the icon displayed on the first area to be executed if a voice command corresponding to the text displayed on the second area is recognized.

According to another embodiment of the present invention, the controller 540 controls a number corresponding to each icon to be displayed if a text corresponding to the memory 530 does not exist. This will be described in more detail with reference to FIG. 11.

The memory 530 stores a text arranged to be closest to the icon as a corresponding text. This will be described in more detail with reference to FIGS. 12 and 13.

If two or more of icons are stored in the memory 530 and two or more of texts corresponding to the icons exist, the controller 540 regards the text stored most frequently as a corresponding text. This will be described in more detail with reference to FIGS. 12 and 13.

The memory 530 is designed to be automatically updated through network communication with another external device. This will be described in more detail with reference to FIGS. 18(a), 18(b) and 18(c).

The controller 540 is designed to track user's eyes by controlling a camera and extract a corresponding text for only icons within the range that the user's eyes are detected. This will be described in more detail with reference to FIGS. 9 and 10.

The aforementioned first area and second area are the same as or different from each other.

The action for entrance of the voice mode is designed to correspond to at least one of a command from a remote controller, a specific voice command and a specific gesture.

Figure 6:
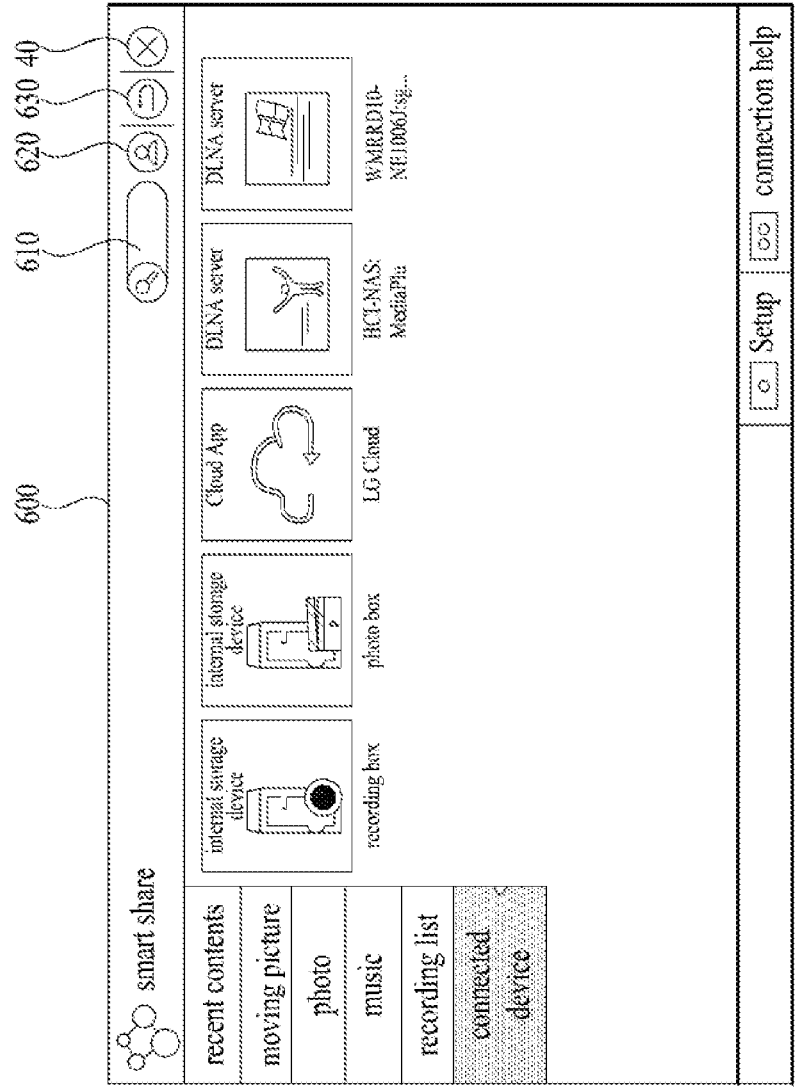
FIG. 6 illustrates a screen prior to entrance of a voice input mode according to one embodiment of the present invention.

FIG. 6 illustrates a screen prior to entrance of a voice input mode according to one embodiment of the present invention.

As described again in short, if the voice command mode is executed (for example, mike button press of remote controller or specific gesture recognition), a text corresponding to an icon having no text is output.

For example, the output time of the text may be limited to a predetermined time, or may be restricted until the voice command is input. In this case, it is advantageous that data or energy loss due to unnecessary text display may be avoided.

On the other hand, FIG. 6 illustrates a screen before an action for a voice input mode is sensed. As shown in FIG. 6, the display device 600 includes icons 610, 620, 630 and 640 having no text.

At this time, even in the case that the display device 600 is capable of voice recognition, since the user does not know what a text corresponding to each icon is, the user cannot execute the corresponding icon through voice recognition.

However, according to one embodiment of the present invention, if a signal converted to the voice input mode is sensed, the screen shown in FIG. 6 is automatically changed to any one of screens shown in FIGS. 7 to 10.

Figure 7:
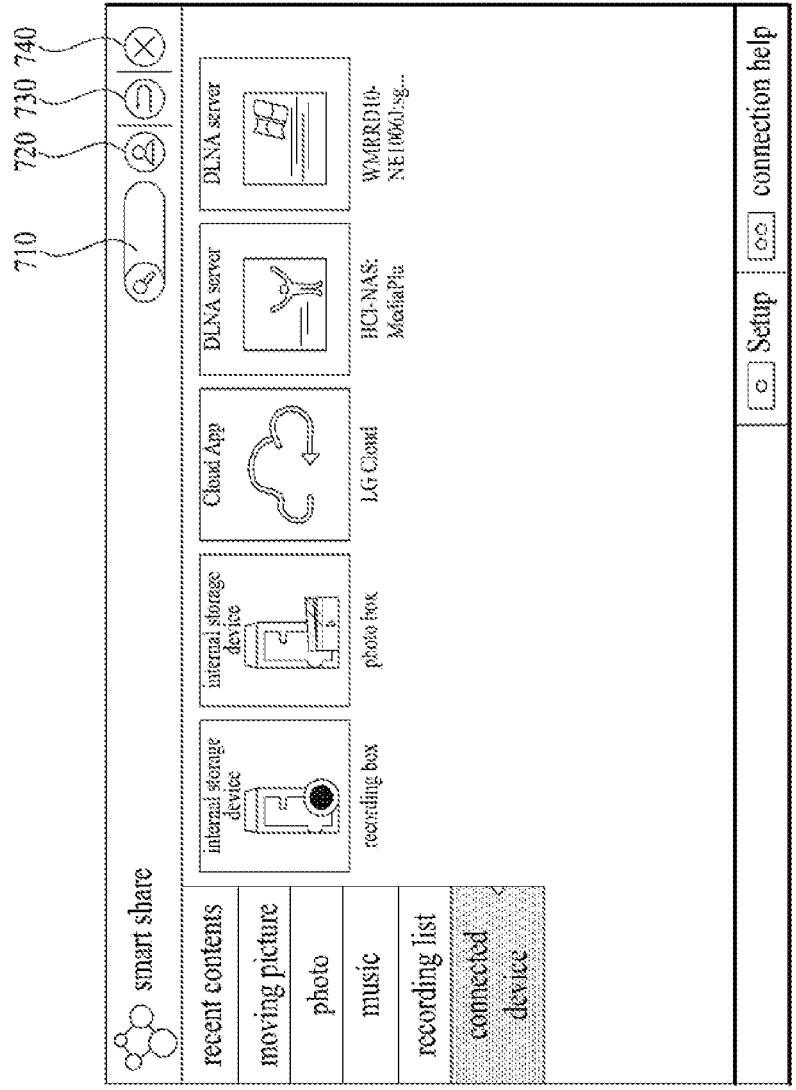
FIG. 7 illustrates a screen in which a voice input mode according to one embodiment of the present invention is executed.

FIG. 7 illustrates a screen in which a voice input mode according to one embodiment of the present invention is executed.

As shown in FIG. 7, a first text 710 corresponding to the first icon (610 of FIG. 6) is displayed below the first icon, and a second text 720 corresponding to the second icon (620 of FIG. 6) is displayed below the second icon.

Moreover, a third text 730 corresponding to the third icon (630 of FIG. 6) is displayed below the third icon, and a fourth text 740 corresponding to the fourth icon (640 of FIG. 6) is displayed below the fourth icon.

Although the corresponding text is located below the icon in FIG. 6, the corresponding text may be displayed on another adjacent area in accordance with the need of the person skilled in the art within the scope of the present invention.

Meanwhile, various embodiments for extracting a text corresponding to each icon will be described in more detail with reference to FIGS. 11 to 17.

Therefore, the user may execute the first icon 610 by uttering a voice ("search") corresponding to the first text 710, or may execute the second icon 620 by uttering a voice ("user") corresponding to the second text 720.

Moreover, the user may execute the third icon 630 by uttering a voice ("back") corresponding to the third text 730, or may execute the fourth icon 640 by uttering a voice ("end") corresponding to the fourth text 740.

That is, the user cannot execute a desired icon if the user does not memorize a voice command corresponding to the desired icon in FIG. 6, whereas an icon corresponding to an icon having no text is displayed in FIG. 7. Therefore, in FIG. 7, it is advantageous that the user can check and then utter the corresponding text.

Figure 8:
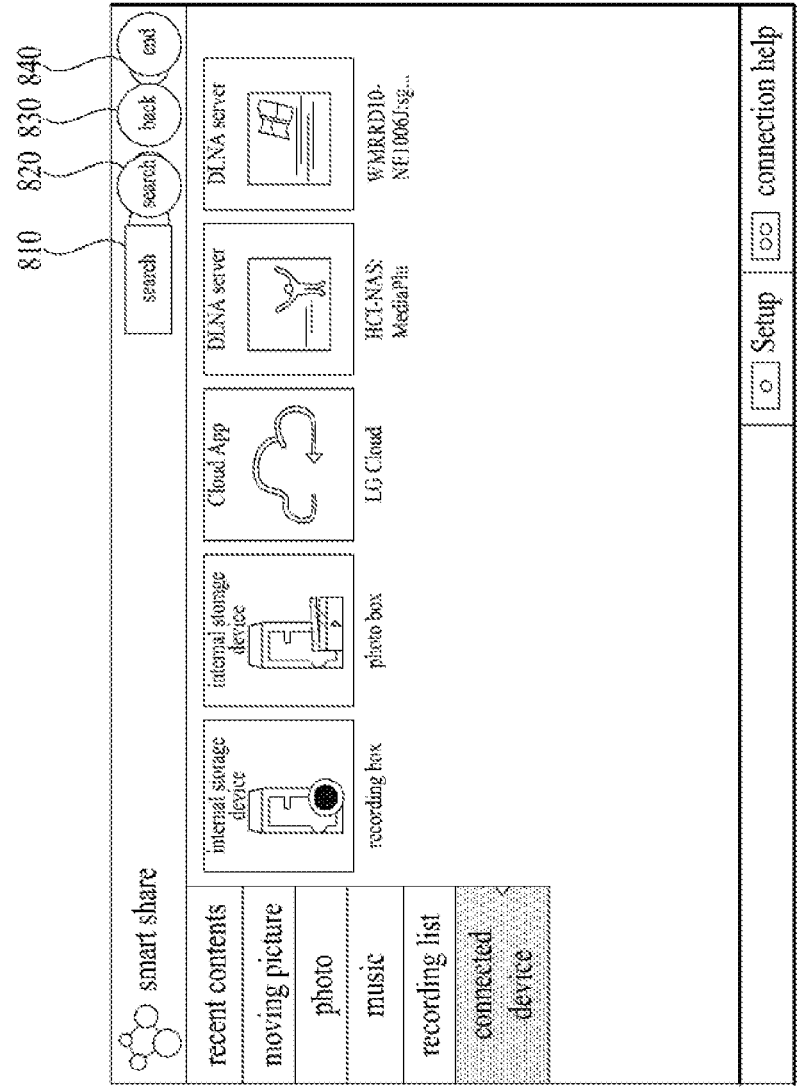
FIG. 8 illustrates a screen in which a voice input mode according to another embodiment of the present invention is executed.

FIG. 8 illustrates a screen in which a voice input mode according to another embodiment of the present invention is executed.

The screen of FIG. 8 is designed such that a text is displayed on an area where each icon is arranged, as compared with that of FIG. 7.

That is, the screen of FIG. 8 is designed such that the first icon 610 shown in FIG. 6 is not seen on the area where the first icon 610 is arranged and a first text 810 corresponding to the first icon is only displayed thereon. Moreover, the screen of FIG. 8 is designed such that the second icon 620 shown in FIG. 6 is not seen on the area where the second icon 620 is arranged and a second text 820 corresponding to the second icon is only displayed thereon.

Likewise, the screen of FIG. 8 is designed such that the third icon 630 shown in FIG. 6 is not seen on the area where the third icon 630 is arranged and a third text 830 corresponding to the third icon is only displayed thereon. And, the screen of FIG. 8 is designed such that the fourth icon 640 shown in FIG. 6 is not seen on the area where the fourth icon 640 is arranged and a fourth text 840 corresponding to the fourth icon is only displayed thereon.

Particularly, if a size of the icon is relatively great or there is little space for arranging the text around the icon, the embodiment shown in FIG. 8 is relatively more preferable than that shown in FIG. 7.

Moreover, it is favorable to emphasize the text more greatly than the shape of the icon after the voice input mode is executed. This is because that the icon is intended to be selected as interface not voice, whereas it is likely that the user may select the text not icon in the voice input mode.

Figure 9:
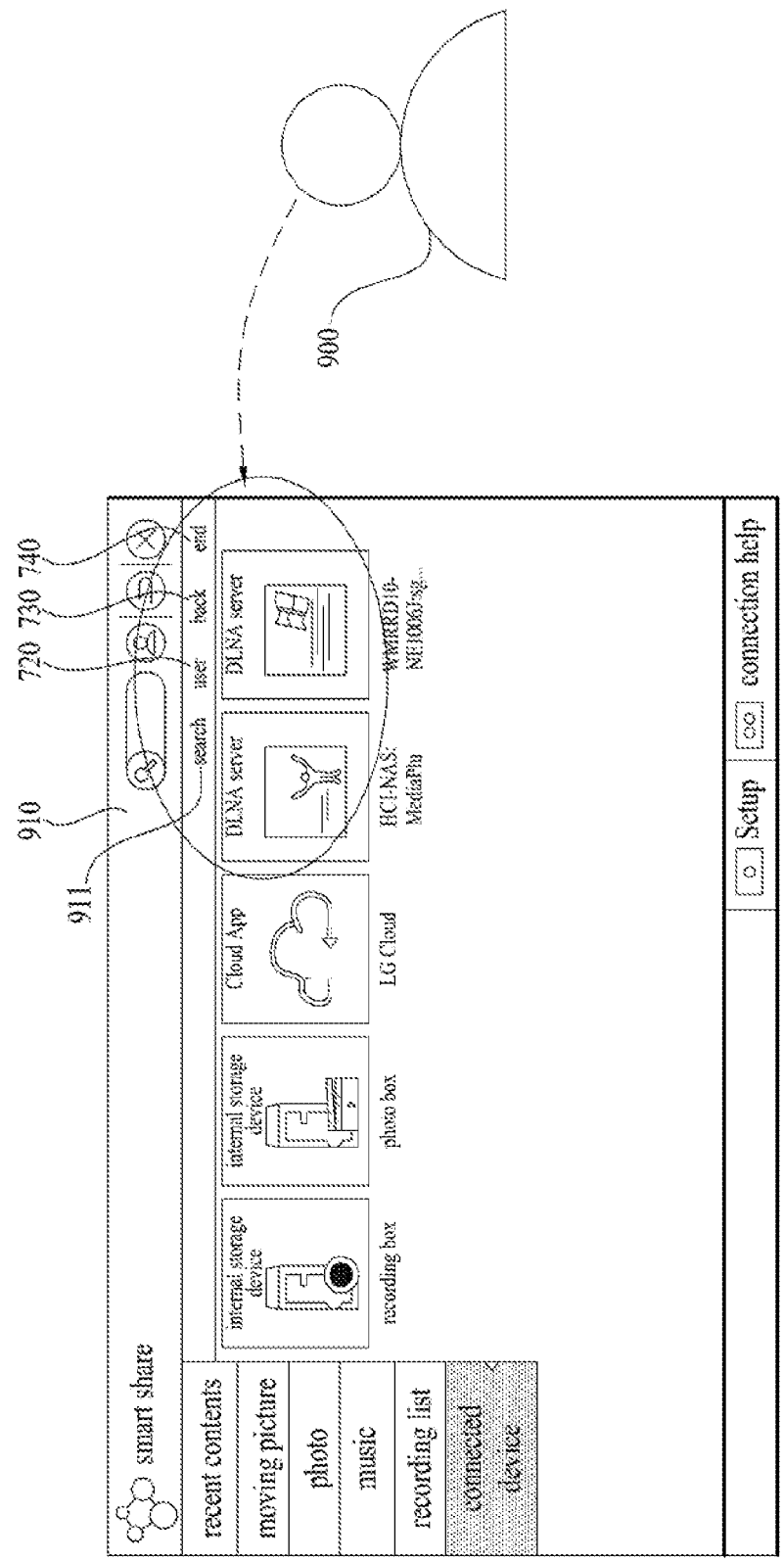
FIGS. 9 and 10 illustrate screens in which a voice input mode according to still another embodiment of the present invention is executed.
Figure 10:
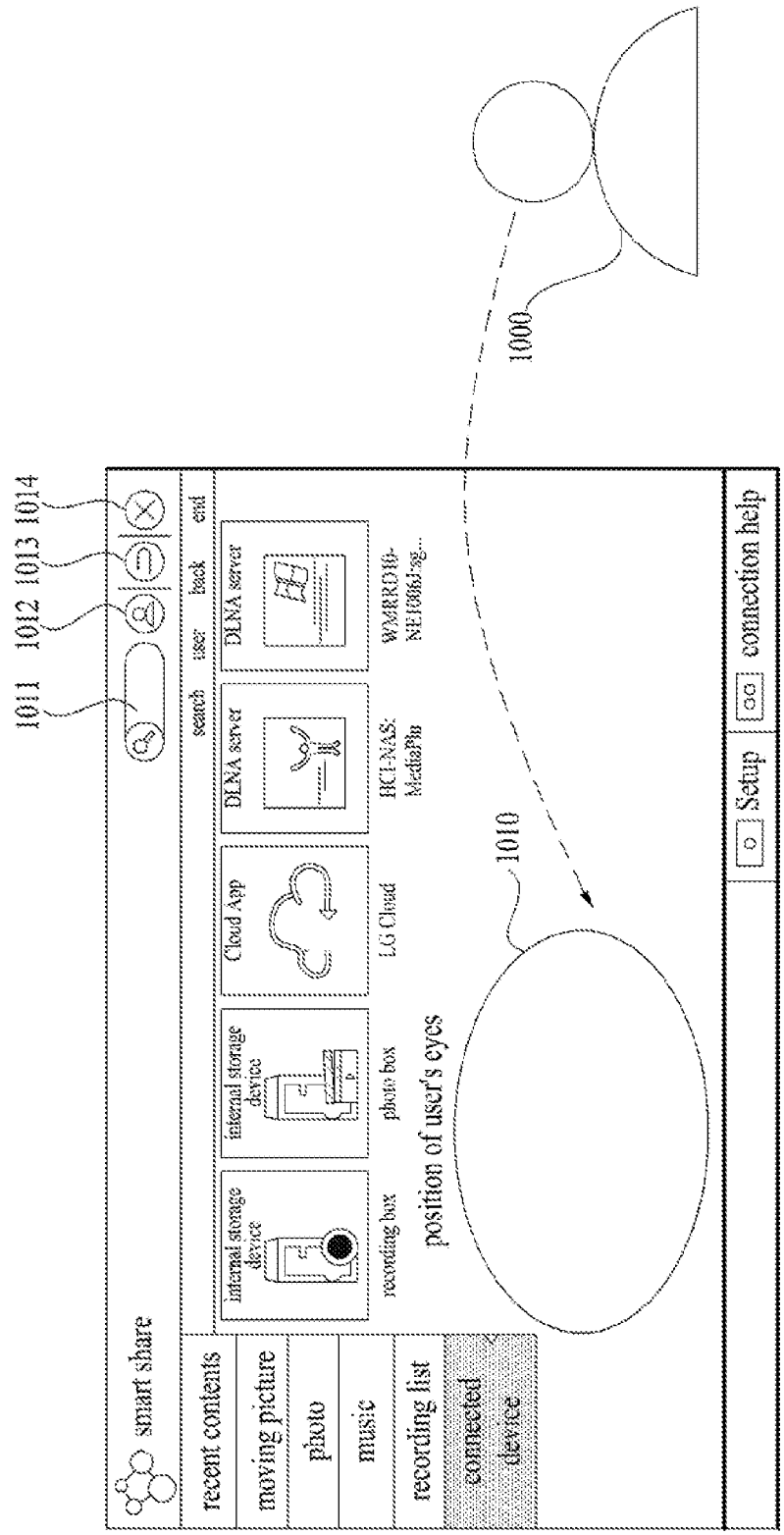

FIGS. 9 and 10 illustrate screens in which a voice input mode according to still another embodiment of the present invention is executed.

Although not shown in FIG. 5, the display device according to still another embodiment of the present invention includes a camera and an eye tracking module. All eye tracking technologies, which are currently known, are applicable to the present invention. Examples of the eye tracking technologies include Orbital Eye Tracking and Gaze Position Tracking.

In the present invention, the eye tracking technology has been introduced to avoid loss caused by extraction and display of an unnecessary text.

As shown in FIG. 9, if a user 900 located in front of the display device according to one embodiment of the present invention looks at a first specific area 910 within the screen, it is possible to detect that the user's eyes looks at the first specific area 910, through the camera and the eye tracking module within the display device.

At this time, texts corresponding to first to fourth icons within the first specific area 910 are extracted and displayed. For example, it is designed such that the first text 911 corresponding to the first icon within the first specific area 910, the second text 912 corresponding to the second icon within the first specific area 910, the third text 913 corresponding to the third icon within the first specific area 910, and the fourth text 914 corresponding to the fourth icon within the fourth specific area 910 are restrictively displayed. The process of extracting and displaying texts corresponding to icons arranged on the other areas except the first specific area 910 may be designed to be paused within the scope of the present invention.

On the other hand, as shown in FIG. 10, if a user 1000 looks at a second area 1010 within the screen, the process of extracting and displaying texts respectively corresponding to icons 1011, 1012, 1013 and 1014 within the first area shown in FIG. 9 is not performed.

If the present invention is implemented as shown in FIGS. 9 and 10, it is expected that loss caused by extraction and display of unnecessary texts may be reduced.

Figure 11:
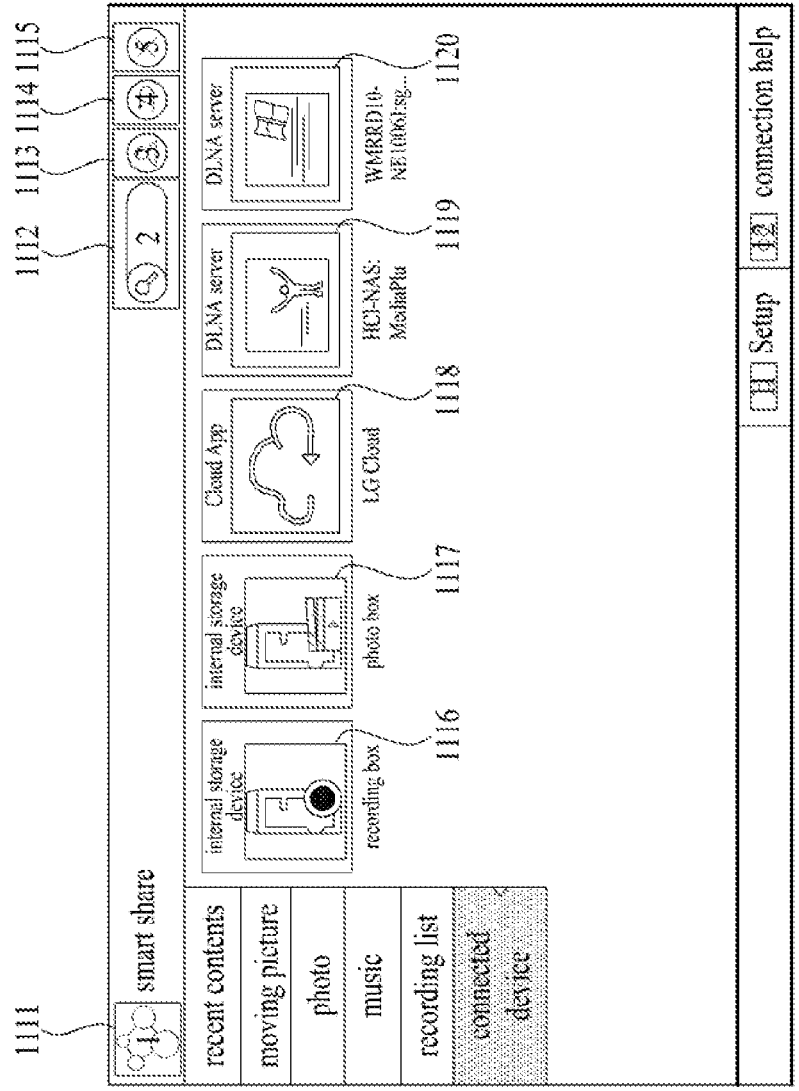
FIG. 11 is a diagram illustrating a voice recognition process when icon and text mapping data do not exist.

FIG. 11 is a diagram illustrating a voice recognition process when icon and text mapping data do not exist.

It has been described on the assumption of the process of extracting a text corresponding to each icon with reference to the above-described drawings. Hereinafter, various embodiments that a text corresponding to an icon will be described with reference to FIG. 11 and subsequent drawings. If a title corresponding to each icon is designated, a corresponding text may be extracted from additional information mapped into the icon. However, a solution corresponding to the case that a text corresponding to each icon is not mapped previously will be required.

If icon and text mapping data (for example, table format), which will be described with reference to FIG. 12 and subsequent drawings, are not stored in a memory, a random number is given to each icon and then displayed as shown in FIG. 11.

In this case, it is advantageous that the user may execute a desired icon even though the user does not know a detailed function for each icon.

For example, as shown in FIG. 11, a number 1 is displayed on a first icon 1111, a number 2 is displayed on a second icon 1112, a number 3 is displayed on a third icon 1113, a number 4 is displayed on a fourth icon 1114, a number 5 is displayed on a fifth icon 1115, 1, a number 6 is displayed on a sixth icon 1116, a number 7 is displayed on a seventh icon 1117, a number 8 is displayed on an eighth icon 1118, and a number 9 is displayed on a ninth icon 1119.

Meanwhile, as shown in FIG. 11, numbering according to the position of each icon corresponds to another feature of the present invention.

A supplementary method for extracting a text for each icon will be described in the embodiments described with reference to FIG. 12 and subsequent drawings. Since the user cannot predict a function of each icon exactly in case of FIG. 11, the embodiment, which will be described with reference to FIG. 12, is required.

Figure 12:
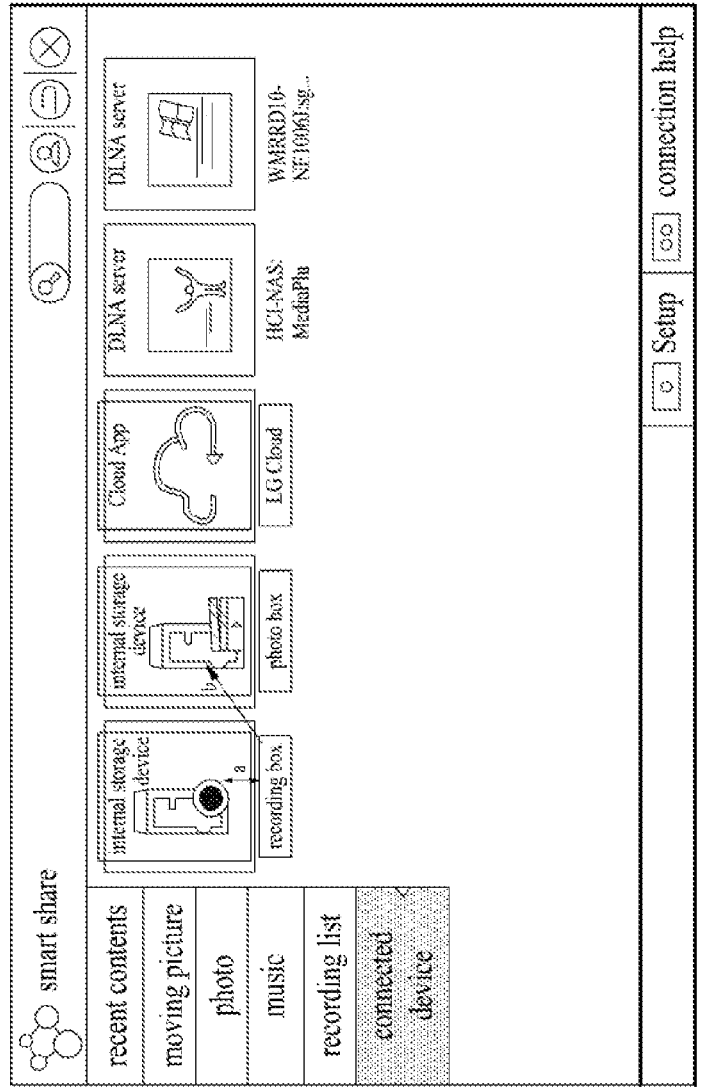

FIGS. 12 and 13 are diagrams illustrating a process of generating icon and text mapping data in accordance with one embodiment of the present invention.

A text output to the screen may be recognized using OCR (Optical Character Reader) technique, etc. This technique cannot be applied to an icon on which a text is not displayed in the form of image.

As shown in FIG. 12, a text "recording box" in the form of image output to the screen may be recognized. However, a reference for determining an icon into which the text "recording box" will be mapped is required.

At this time, a first icon arranged at a distance "a" with the text "recording box" and a second icon arranged at a distance "b" with the text "recording box" are compared with each other, whereby the icon arranged to be closer to the text is mapped into the text. In FIG. 12, since the distance "a" is shorter than the distance "b", it is designed such that the text "recording box" is mapped into the first icon.

Moreover, as shown in FIG. 13, a resultant value obtained as a result of extracting text and icon within the screen through OCR is stored in the memory in the form of table. Of course, the scope of the present invention is not limited to the form of the table shown in FIG. 13.

The database shown in FIG. 13 is configured to reduce the possibility of error caused by OCR.

For example, as shown in FIG. 13, if the text "recording box" corresponding to a specific icon is mapped into the specific icon ten times and a text "hard drive" is mapped into the same specific icon once, the text "recording box" is selected as a text corresponding to the specific icon.

Alternatively, the mapping table shown in FIG. 13 may be designed such that the user may directly select the text by outputting the mapping table in the form of OSD, within the scope of the present invention.

Figure 14:
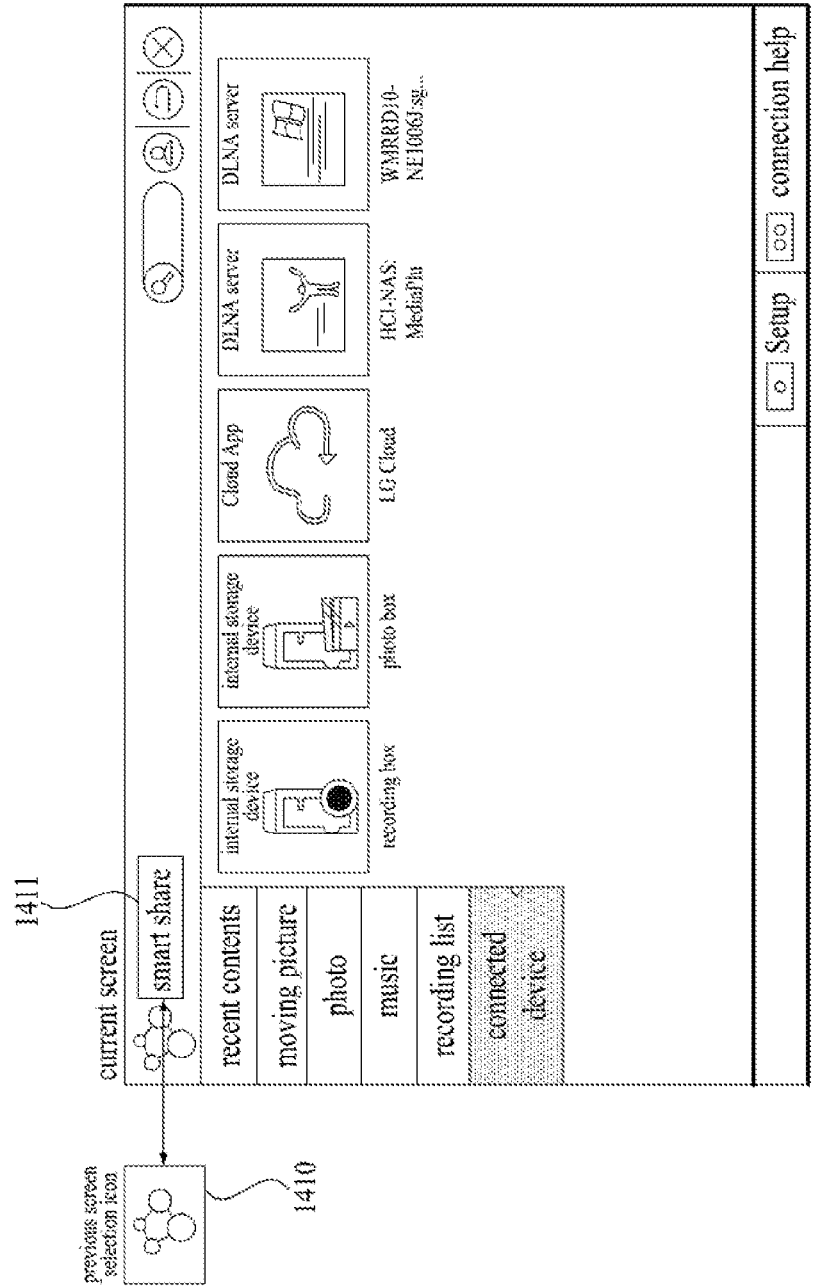

FIGS. 14 and 15 are diagrams illustrating a process of generating icon and text mapping data in accordance with another embodiment of the present invention.

Although a text is not included when an initial icon is displayed, the corresponding text may be displayed together with the icon if the user selects the icon. Considering this, embodiments of FIGS. 14 and 15 will be described.

As shown in a left side of FIG. 14, no text is displayed until a random icon 1410 is selected. However, if the icon 1410 is selected, as shown in a right side of FIG. 14, a text 1411 for describing the icon is displayed around the icon together with the icon.

Therefore, the text of the current screen and the selected icon of the previous screen are mapped into each other, whereby the mapped result is updated in a database shown in FIG. 15.

Moreover, when a specific icon is selected, a text (additional description) corresponding to the specific icon is displayed on a predetermined position (for example, top left or top center). Considering this, it is designed such that the selected icon and the text displayed on the top left or the top center of the screen are mapped into each other and the mapped data are stored, within the scope of the present invention.

Meanwhile, a brief algorithm for Korean language recognition of the aforementioned OCR (Optical Character Recognition) program will be described. A thinning process and a segmentation process remove an unnecessary image portion of an input text and then maintains connectivity of text lines and performs conversion of a unit thickness, and a recognition process recognizes a text by splitting the text into initial, medial and final sounds, and horizontal and vertical vowels and consonant.

If a problem occurs in the recognition process, more segmented process is performed or the previous processes are repeated. After these processes are completed, if text recognition is completed, letters are output in the form of text through a graphic output module.

Figure 16:
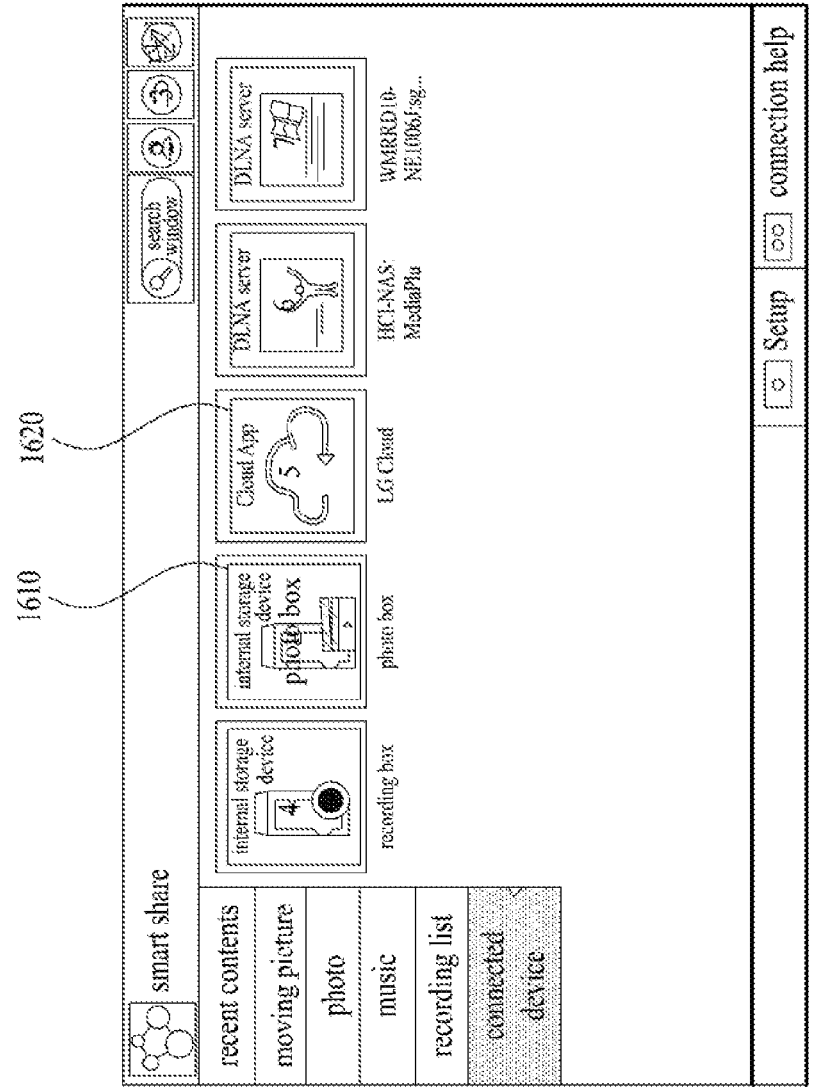
Figure 18:
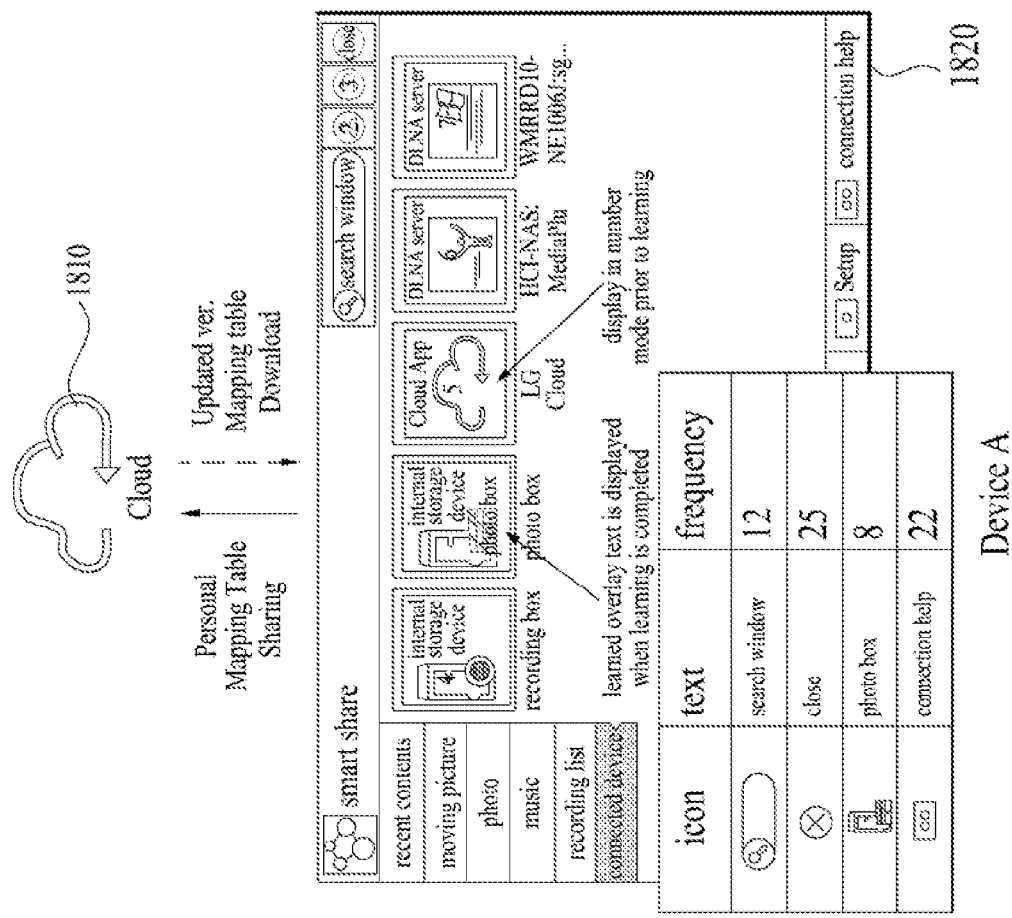
FIGS. 18(a), 18(b) and 18(c) are diagrams illustrating a process of updating icon and text mapping data in accordance with one embodiment of the present invention.
Figure 18:
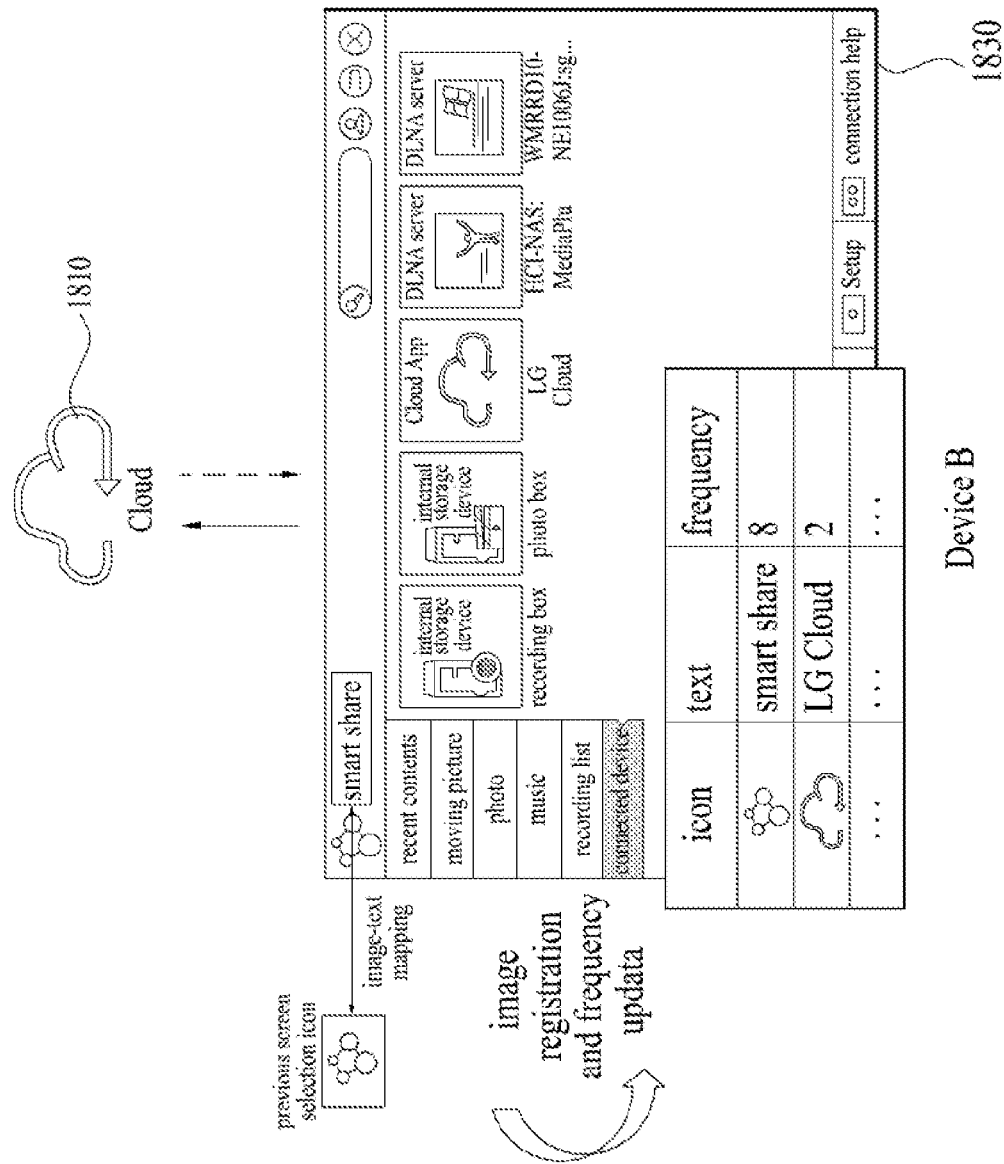
Figure 18:
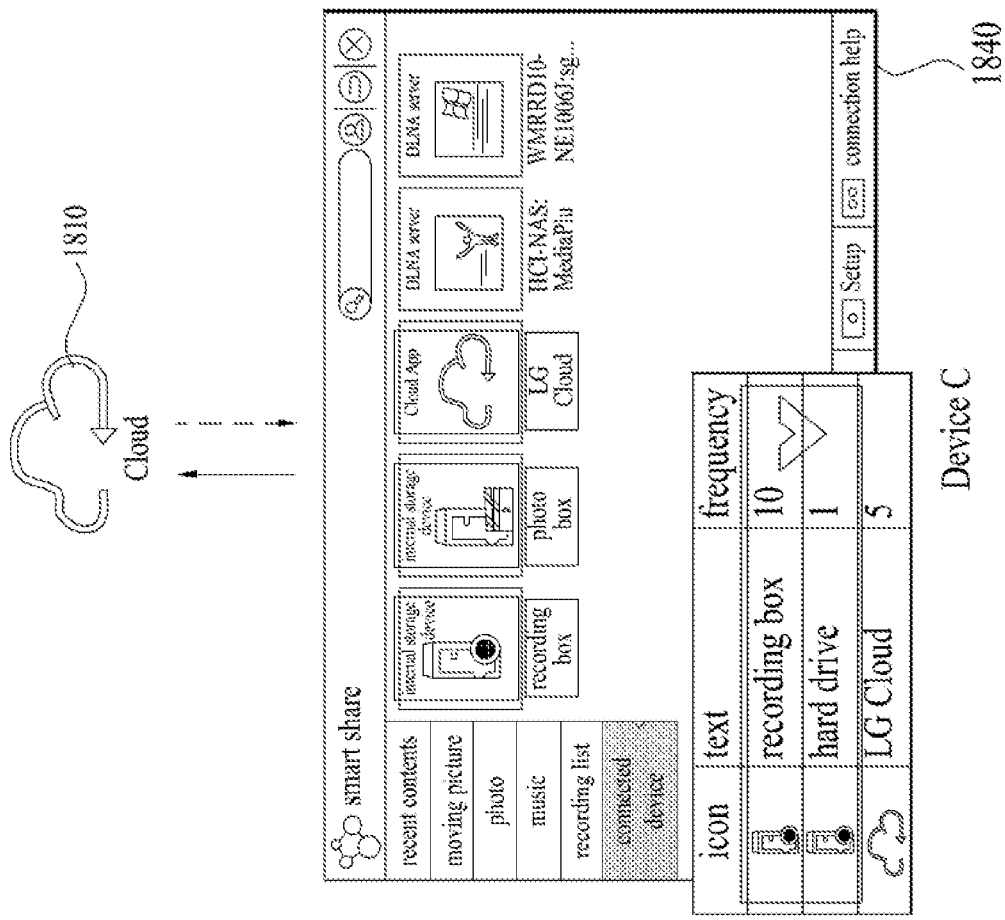

FIGS. 16 and 17 are diagrams illustrating a process of generating icon and text mapping data in accordance with other embodiment of the present invention.

The processes of FIGS. 12 to 15 are repeated, whereby a mapping text corresponding to each icon is completed as shown in FIG. 17. Although data shown in FIG. 17 may be referred to as an icon-text mapping table, the scope of the present invention is not limited to the example of FIG. 17.

Therefore, referring to a database of FIG. 17, if the user enters a voice command mode, the screen shown in FIG. 16 is output.

For example, a first icon 1610 outputs a text "photo box". This is possible because the text "photo box" is stored in the database shown in FIG. 17. On the other hand, a second icon 1620 is designed to display a number 5 instead of text. This is because that a text corresponding to the second icon 1620 is not stored in the database (memory) shown in FIG. 17.

That is, a text registered in the database at least once may be displayed together with or replaced with an icon, and since there is no text corresponding to an icon which is not registered in the database, a random number may be displayed to solve a problem. Therefore, according to one embodiment of the present invention, regardless of text or number, all icons may be manipulated by voice. On the other hand, according to the related art, a problem occurs in that the user should previously know a corresponding command language.

FIGS. 18(a), 18(b) and 18(c) are diagrams illustrating a process of updating icon and text mapping data in accordance with one embodiment of the present invention.

In the aforementioned embodiments, a mapping table is generated by one device without networking. However, it is required to enhance exactness by sharing a mapping table with another device without using the mapping table learned and generated by one device.

For example, as shown in FIGS. 18(a), 18(b) and 18(c), devices 1820, 1830 and 1840 respectively located in different homes are connected with one another by a network such as Internet, and an icon-text mapping table stored in a memory of each of the devices may be uploaded in a cloud server 1810 and another table may be downloaded.

At this time, according to another feature of the present invention, a version may be added to each table, whereby unnecessary table request and download may be avoided in advance.

Figure 19:
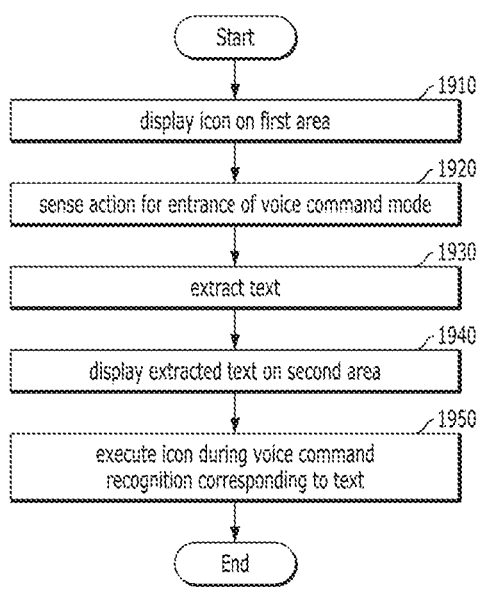
FIG. 19 is a flow chart illustrating a control method of a display device capable of voice recognition according to one embodiment of the present invention.

FIG. 19 is a flow chart illustrating a control method of a display device capable of voice recognition according to one embodiment of the present invention. FIG. 19 may be complementarily construed by those skilled in the art with reference to the previous drawings.

The display device capable of voice recognition according to one embodiment of the present invention displays at least one or more icons arranged in accordance with a predetermined order on a first area (S1910), and senses an action for entrance of a voice command mode (S1920).

The display device extracts a text corresponding to the icon displayed on the first area with reference to a memory (S1930), and displays the extracted text on a second area (S1940). If a voice command corresponding to the text displayed on the second area is recognized, the display device is designed to execute the icon displayed on the first area (S1950).

The step S1930 further includes a step of displaying a number corresponding to each icon if a corresponding text does not exist in the memory.

The memory stores a text located to be closest to the icon as the corresponding text. Moreover, the step S1930 further includes a step of regarding a text most frequently stored as the corresponding text if two or more icons stored in the memory and two or more texts corresponding to the icons exist.

The memory is updated through network communication with another external device. Since this has been described in detail with reference to FIGS. 18(a), 18(b) and 18(c), its repeated description will be omitted.

The step S1930 further includes a step of tracking user's eyes, and a step of extracting a corresponding text with respect to an icon only within the range that the user's eyes are detected.

As described above, the first area (icon) and the second area (text) are the same as or different from each other. The action in the step S1920 corresponds to at least one of a command from a remote controller, a specific voice command and a specific gesture.

Meanwhile, as a method for implementing the embodiments described with reference to FIGS. 1 to 19, it will be apparent to those skilled in the art that a corresponding function may be embedded in the display device during manufacture of the display device and also may be downloaded in the form of application within the scope of the present invention.

The above-described present invention may be implemented in a medium in which a program is recorded, as a code that can be read by a computer. Examples of the medium that can be read by a computer include an HDD (hard disk drive), an SSD (solid state disk), an SDD (silicon disk drive), a ROM, a RAM, a CD-ROM, a magnetic tape, a floppy disk, and an optical data storage unit. Also, another example of the recording medium may be implemented in a type of carrier wave (for example, transmission through Internet). Also, the computer may include the controller 180 of the mobile terminal. Thus, the above detailed description is to be considered in all respects as illustrative and not restrictive. The scope of the present invention should be determined by reasonable interpretation of the appended claims and all changes which come within the equivalent scope of the invention are included in the scope of the invention.

MODE FOR CARRYING OUT THE INVENTION

The mode for carrying out the invention has been described as above, and may be modified by those skilled in the art.

INDUSTRIAL APPLICABILITY

Since the present invention is applicable to a smart TV, a mobile device, etc., its industrial applicability is approved.

The invention claimed is:

1. A control method of a device capable of voice recognition, the control method comprising:
    displaying one or more icons;
    sensing an action for entering a voice command mode;
    in response to the sensed action, displaying text information for each of the one or more icons for identifying each of the one or more icons by voice, wherein the text information is displayed to be correspondingly overlaid on the one or more icons such that the text information and the one or more icons are simultaneously visible; and
    executing a selected icon of the one or more icons in response to a voice command corresponding to the displayed text information associated with the selected icon,
    wherein the text information for each of the one or more icons is automatically updateable based on a frequency of selection of each of the text information,
    wherein the text information for each of the one or more icons is retrieved from a correspondence table stored in a memory, and
    wherein the text information displayed for a particular icon of the one or more icons corresponds to an index number if text corresponding to the particular icon is not found in the correspondence table.

2. The control method according to claim 1, wherein when two or more text information corresponding to a particular icon of the one or more icons exists, a text information most frequently stored in a memory of the two or more text information is displayed to replace the particular icon.

3. The control method according to claim 1, further comprising tracking a user's eyes via a camera or a sensor of the device, wherein only icons displayed at an area being viewed by the user are replaced by the automatically updateable text information.

4. The control method according to claim 1, wherein the sensed action corresponds to at least one of a command from a remote controller, a specific voice command, or a specific gesture.

5. A device capable of voice recognition comprising:
    a display for displaying one or more icons;
    a memory; and
    a hardware controller operable to:
    obtain information on a sensed action for entering a voice command mode;
    in response to the sensed action, cause the display to display text information for each of the one or more icons for identifying each of the one or more icons by voice, wherein the text information is displayed to be correspondingly overlaid on the one or more icons such that the text information and the one or more icons are simultaneously visible; and
    execute a selected icon of the one or more icons in response to a voice command corresponding to the displayed text information associated with the selected icon,
    wherein the text information for each of the one or more icons is automatically updateable based on a frequency of selection of each of the text information,
    wherein the text information for each of the one or more icons is retrieved from a correspondence table stored in a memory, and
    wherein the text information displayed for a particular icon of the one or more icons corresponds to an index number if text corresponding to the particular icon is not found in the correspondence table.

6. The device according to claim 5, wherein the controller is further configured to, when two or more text information corresponding to a particular icon of the one or more icons exists, replace the particular icon of the one or more icons with a text information most frequently stored in a memory of the two or more text information.

7. The device according to claim 5, further comprising a camera or sensor configured to track a user's eyes, wherein the controller is further configured to replace only icons displayed at an area being viewed by the user with the automatically updateable text information.

8. The device according to claim 5, wherein the sensed action corresponds to at least one of a command from a remote controller, a specific voice command, or a specific gesture.

* * * * *